(12) United States Patent
Ravindranath et al.

(10) Patent No.: US 11,797,422 B2
(45) Date of Patent: Oct. 24, 2023

(54) CLOUD CONTROLLED BUG RECOVERY

(71) Applicant: ARRIS Enterprises LLC, Suwanee, GA (US)

(72) Inventors: Nithin Raj Kuyyar Ravindranath, Karnataka (IN); Vinod Jatti, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 208 days.

(21) Appl. No.: 17/491,558

(22) Filed: Oct. 1, 2021

(65) Prior Publication Data

US 2022/0114078 A1    Apr. 14, 2022

Related U.S. Application Data

(60) Provisional application No. 63/090,331, filed on Oct. 12, 2020.

(51) Int. Cl.
*G06F 9/44* (2018.01)
*G06F 11/36* (2006.01)
*G06F 11/07* (2006.01)

(52) U.S. Cl.
CPC ...... *G06F 11/3656* (2013.01); *G06F 11/0772* (2013.01); *G06F 11/0793* (2013.01); *G06F 11/366* (2013.01)

(58) Field of Classification Search
None
See application file for complete search history.

(56) References Cited

U.S. PATENT DOCUMENTS

| | | | |
|---|---|---|---|
| 7,694,179 B2* | 4/2010 | Sato | G06F 11/079 714/25 |
| 10,365,962 B2* | 7/2019 | Sherlock | G06F 11/0793 |
| 2008/0288830 A1* | 11/2008 | Marinucci | G06F 11/0715 714/57 |
| 2019/0235942 A1* | 8/2019 | Flohr | G06F 11/366 |
| 2020/0097389 A1* | 3/2020 | Smith | G06F 11/0793 |
| 2020/0241949 A1* | 7/2020 | Basu | G06F 11/0793 |

* cited by examiner

*Primary Examiner* — Qamrun Nahar
(74) *Attorney, Agent, or Firm* — Panitch Schwarze Belisario & Nadel LLC (57) ABSTRACT

Disclosed herein is a system and method for bug fix recovery in an electronic device connected to a network. If a bug affecting a deployed electronic device is discovered, bug fix instructions for fixing, mitigating, or recovering from the bug, including rules and executable actions, can be stored in a cloud based server in communication with a deployed electronic device. Each set of instructions is associated with one or more identifiers of devices, firmware versions, and/or software versions that are affected by the bug. The server can be configured to query deployed electronic devices, and/or the deployed electronic devices can be configured to query the server to determine if a bug fix that is relevant to the electronic device has been stored on the server. Instructions can then be transmitted to the electronic device for execution or for display or announcement to a user (if user action is required).

17 Claims, 6 Drawing Sheets

CLOUD CONTROLLED BUG RECOVERY

BACKGROUND

Technical Field

The disclosure relates to a method and apparatus to perform improved recovery from errors in operation of networked computing devices.

Description of the Related Art

Cable service providers, which are also referred to as Multiple System Operators (MSO), or any communication or content distribution business that operates through a cable network, including e.g., fiber optic, coaxial cable and hybrid systems, renders services to subscribers. The services can include, but are not limited to, different subscription plans for broadband Internet access, live television, movies, visual media, and telephony. In order to consume these services, subscribers connect to a network owned (or co-owned or rented) by the broadband cable operator which is implemented according to, e.g., the Data Over Cable Service Interface Specification (DOCSIS) standard. Various field deployed devices may be provided by the service provider or the subscriber, including set-top boxes, streaming sticks, smart TV's, DOCSIS modems, optical network interfaces (ONTs), routers, wifi access points, IP telephony devices, and the like, to provide various service functions. In some instances, more than one such function may be performed by a single device.

Sometimes it so happens that the software or firmware in a field deployed device contains an error or otherwise operates in an unexpected and undesirable fashion under certain circumstances, i.e. the software or firmware contains a "bug." These bugs might either directly get reported by a customer or, a service provider also might have realized/found bugs on the devices with a specific version of firmware or software. For many field reported bugs, a service provider or device manufacturer might already know a temporary work around or fix that can be used until new software or firmware with a fix is upgraded on field deployed devices. In some instances, this fix can take the form of a patch, e.g., software instructions that modify the operation of the device so as to avoid circumstances that cause the bug or that replaces a portion of the firmware or software that contains the bug. Deploying a patch or complete firmware on field deployed device can be costly and time consuming. However, delaying deployment of a patch can also be costly due the repeated customer service calls and bug reports.

There is a need in the art for methods and systems that can better distribute a fix or workaround in response to the discovery of a bug in field deployed devices.

SUMMARY

Disclosed herein is a cloud-based system and method to provide instructions to field deployed devices to mitigate a bug until an upgraded firmware or software can be deployed. In some embodiments, these instruction can comprise a unique set of actions to be taken/executed by end devices to recover from or avoid known bugs. In some embodiments, a set of actions and/or rules can associated with each specific bug, type or model of device, and a firmware or software version. In some embodiments, actions are required to be performed externally by customer, e.g., changing device settings manually using a remote controller etc. Under such circumstance, instructions to a customer can be provided though a device by any available human interface medium (for example, through a device inbuilt speaker, a connected TV, over Bluetooth to another device, or via message to a customer registered mobile device).

A bug may be characterized by an unexpected or undesirable behavior resulting from an error in device firmware, a device's operating system, service provider software, third party software, or may result from an unaccounted for interaction between one or more software and/or firmware components and/or other aspects of the operating environment.

A bug fix may take several forms. For example, a bug in device firmware may be temporarily mitigated by turning off or bypassing a feature and/or adjusting a default setting that may trigger a bug. In some instances, a bug may be discovered in third party software, and a temporary fix may be to shut down and restart the application when an error occurs, clear a cache that may become corrupted, limit a setting to avoid conditions that trigger a bug, and/or change a default setting. In some instances, a bug fix may be provided by a service provider to mitigate a bug in third party software until the third party software creator provides an upgrade to the third party software that eliminates the bug. Some bugs may be mitigated by providing executable instructions to a device for patching or replacing software or firmware, replacing or rebuilding data, or by providing instructions to a user to manually configure a device or software setting. A bug fix need not be a permanent correction to firmware or software, or an optimal fix, rather in some embodiments, a work-around is provided that avoids conditions that may trigger a bug or permits easier recovery from the effects of a bug.

BRIEF DESCRIPTION OF THE DRAWINGS

The scope of the present disclosure is best understood from the following detailed description of exemplary embodiments when read in conjunction with the accompanying drawings. Included in the drawings are the following figures.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Network Control and Distribution of Bug Recovery Instructions

Figure 1:
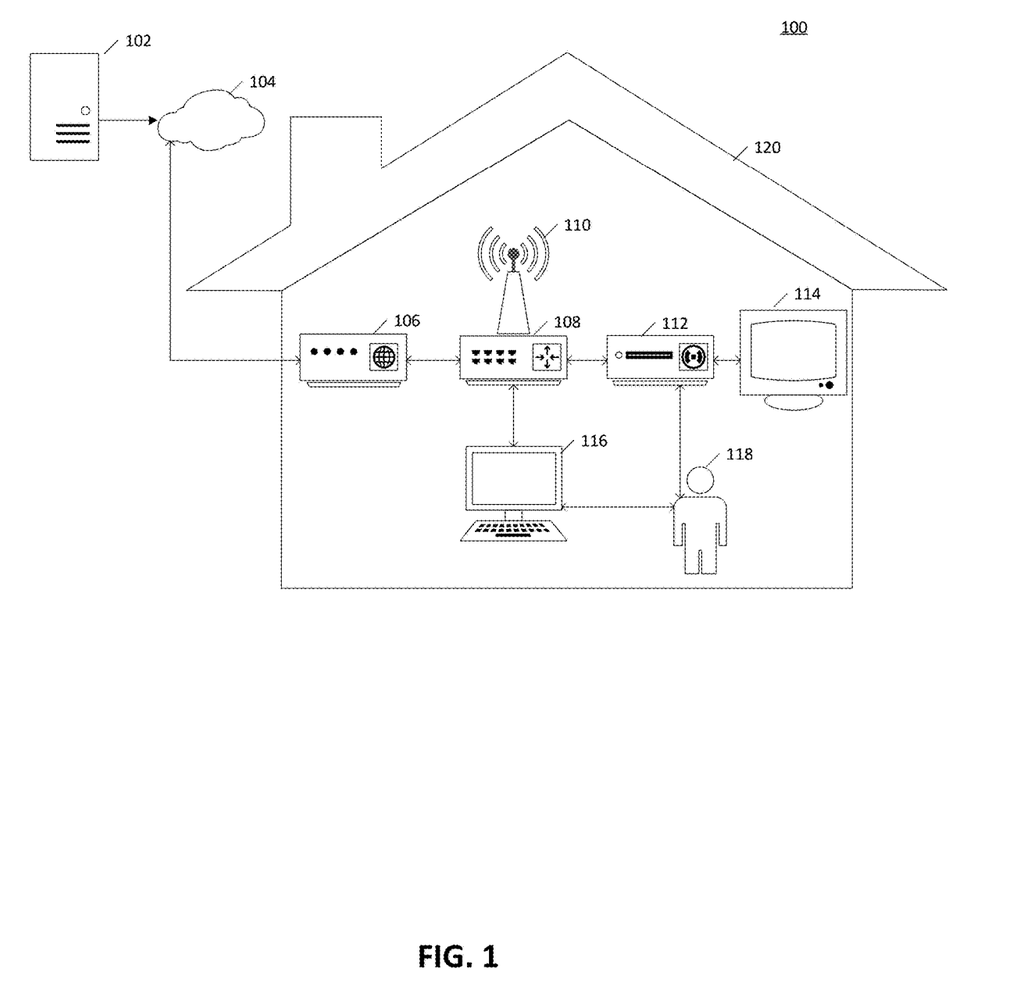
FIG. 1 is a block diagram illustrating a high level system architecture for providing bug fix instructions to a network device.

FIG. 1 illustrates an exemplary system 100 for network control and distribution of bug recovery instructions. The system 100 may include server 102 connected via a communications medium 104 to one or more electronic devices (106-116) that, for example, may be deployed in a home 120. Server 102 may be provided by a product manufacturer or by a service provider. Electronic devices 106-116 may include, for example a DOCSIS modem 106 (or ONT in some embodiments), router 108 (with wifi access point 110), set-top box 112, television 114 (e.g., smart television or other display device), personal computer 116 (e.g., desktop or laptop computer, notebook computer, tablet computer, cellular phone, smart phone, smart watch, etc.) The electronic device 112 and display device 114 may be interfaced through any suitable type of interface, such as coaxial cable, fiber optic cable, infrared transmission, a local area network, radio frequency, Bluetooth, etc.

The electronic devices 106-116 may receive a source signal that is electronically transmitted via a communications medium 104, such as over-the-air (e.g., via wi-fi, Bluetooth, or other suitable wireless communication medium), over a cable connection (e.g., via Ethernet cable, coaxial cable, fiber optic, or other suitable physical cable), via satellite, and/or other suitable communications medium. For example, the communications medium 104 may be a wide area network, cellular communication network, or the Internet.

Server 102, discussed in greater detail below may be configured to receive and store data comprising instructions for bug mitigation and recovery. Each set of instructions may be associated with one or more specific device identifiers (e.g., model number) and/or software identifiers (e.g., software or firmware names and version number).

Instructions may be entirely executable by one or more of devices 106-116 or may require action by user 118. In some embodiments, when a bug has been discovered, a record comprising instructions for a bug fix, mitigation, or recovery, together with applicable device identifiers and/or software identifiers may be transmitted to and stored in server 102 by an operator, e.g., a technician for a service provider.

In some embodiments, server 102 may query one or more of electronic devices 106-116 for a listing of device identifiers of electronic devices 106-116 and/or software identifiers of the software and firmware comprised in the devices or in other devices connected thereto. The server 102 can compare the received listing to identifiers of stored bug fixes, mitigations, and recovery instructions. If a match is found, server 102 may distribute instructions for applicable bug fixes, mitigations, and/or recovery instructions to one or more of electronic devices 106-116. In some embodiments, transmission of instructions comprises transmission of executable instructions (and data where appropriate) that can be executed by one or more of electronic devices 106-116. The electronic device can then execute the instructions. Server can send instructions to specific electronic devices using existing standard protocols (e.g., TR069, SNMP, etc.) or a proprietary protocol.

In some embodiments, one or more of electronic devices 106-116 may be configured to query server 102 for a current listing of device identifiers and/or software identifiers associated with bug fixes, mitigations, and/or recovery instructions that are stored on the server. The electronic device can compare the listing to device identifiers and/or software identifiers associated with the device and/or devices connected to the electronic device. If a match is found, the electronic device may request bug fixes, mitigations, and/or recovery instructions from server 102 In other embodiments, an electronic device may be configured to periodically transmit device identifiers and/or software identifiers to server 102, which can respond with instructions for applicable bug fixes, mitigations, and/or recovery instructions where appropriate.

In some embodiments, where instructions require user action, instructions may be transmitted from server 102 to users, e.g., via text message to a user provided cell phone number or email address, or may be transmitted to one or more of electronic devices 106-116 to be announced or displayed by one or more of electronic devices 106-116.

Devices for Network Control and Distribution of Bug Recovery Instructions

Figure 2:
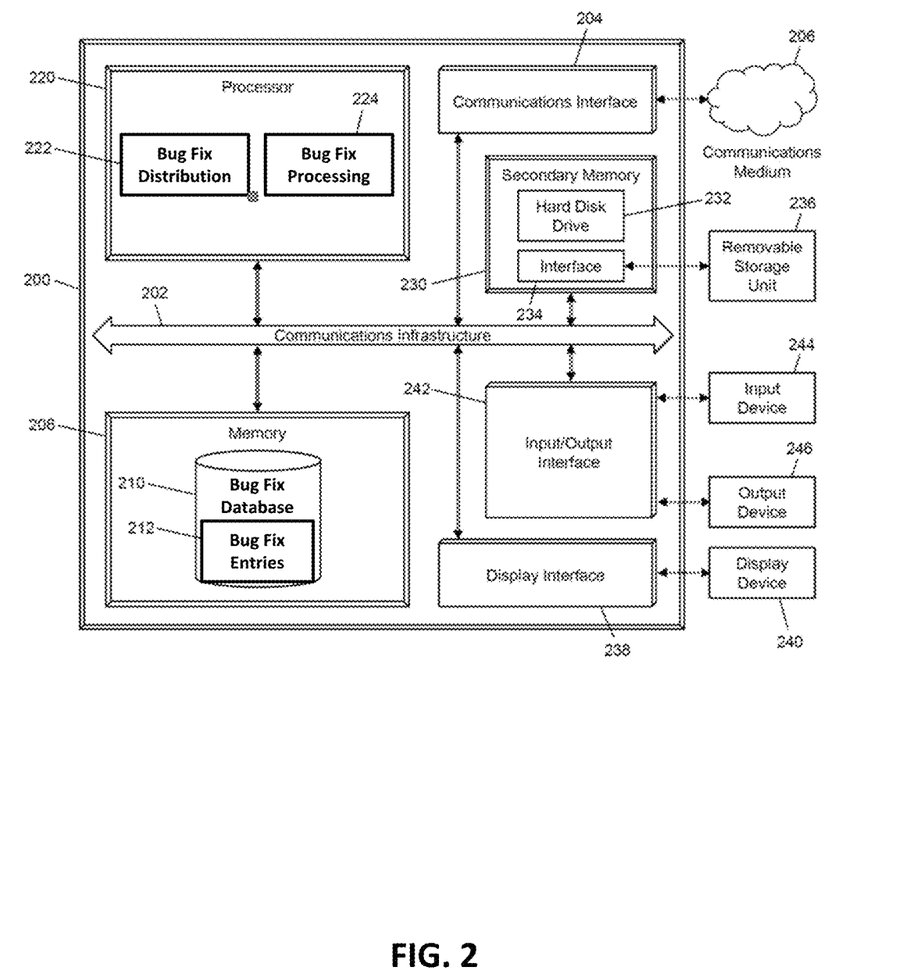
FIG. 2 is an exemplary hardware structure for an embodiment of a device connected to a network for implementing a bug fix.

FIG. 2 illustrates an exemplary hardware structure for an embodiment of a computer system 200 for network control and distribution of bug recovery instructions. It will be apparent to persons having skill in the relevant art that the embodiment of the computer system 200 can be the server 102, electronic devices 106-116, the display device 114, or an integrated combination of these devices (e.g., a smart television 114 comprising an in-built set-top box 112, or an integrated modem 106 with a router 108 comprising a wifi access point 110). Thus, the structure as illustrated in FIG. 2 is provided as illustration only and may not be exhaustive to all possible configurations of the computer system 200 suitable for performing the functions as discussed herein.

The computer system 200 may include a communications infrastructure 202. The communications infrastructure 202 may be configured to transmit data between modules, engines, databases, memories, and other components of the computer system 200 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the computer system 200 and external components of the computer system 200, such as externally connected databases, display devices, input devices, etc.

The computer system 200 may also include a communications interface 204. The communications interface 204 may include one or more interfaces used to interact with and facilitate communications between the computer system 200 and one or more external devices via suitable communications mediums 206. For instance, the communications interface 204 may interface with the communications infrastructure 202 and provide an interface 204 for connecting the computer system 200 to one or more communications mediums 206 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, cable television networks, satellite television networks, the Internet, radio frequency, Bluetooth, near field communication, etc.

In some instances, the computer system 200 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded on the parsing module. For example, the communications interface 204 may include (e.g., or otherwise have access to, such as via the communications infrastructure 202) a parser program configured to receive and transform the received data signal into usable input for the functions performed by the processing device to carry out the methods and systems described herein.

The communications interface 204 may be configured to receive data signals electronically transmitted through a communications medium 106, such as from an Internet service provider, cable television provider, satellite television provider, etc., which may be superimposed or otherwise encoded with source signals that are comprised of video and closed captioning signals. In some instances, a source signal may include a plurality of closed captioning signals, such as closed captioning signals for each of a plurality of different languages, and may also include one or more audio signals.

The computer system 200 may also include a memory 208. The memory 208 may be configured to store data for use by the computer system 200 in perform the functions discussed herein. The memory 208 may be comprised of one or more types of memory using one or more suitable types of memory storage, such as random access memory, read-only memory, hard disk drives, solid state drives, magnetic tape storage, etc. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the computer system 200 may include bug fix data 210, for example configured as a database comprising device and software identifiers associated with bug fix instructions. The bug fix data 210 may be configured to store a plurality of bug fixes 212 using a suitable storage format and schema.

The computer system 200 may also include a processor 220. The processor 220 may be configured to perform the functions of the computer system 200 discussed herein as will be apparent to persons having skill in the relevant art. In some embodiments, the processor 220 may include and/or be comprised of a plurality of engines and/or modules specially configured to perform one or more functions of the processing device. Where computer system 200 is a bug fix server 102, the modules may include a bug fix distribution 222 module for transmitting appropriate bug fixes to electronic devices 106-116. Where computer system 200 is a deployed electronic device 106-116, processor 220 may include a bug fix processing module 224 for executing bug fixes received from server 102. As used herein, the term "module" may refer to software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores". Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

In some embodiments, the computer system 200 may also include a secondary memory 230. The secondary memory 230 may be another memory in addition to the memory 208 that may be used to store additional data for use in performing the functions of the computer system 200 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some cases, the computer system 200 may also include a display interface 238. The display interface may be configured to interface the computer system 200 with one or more display devices 240, such as the display device 104. The display devices 240 may be devices configured to display data received from the computer system 200. Display devices 240 may be any suitable type of display, including, for example, liquid crystal displays, light emitting diode displays, thin film transistor display, capacitive touch displays, etc. In some instances, the computer system 200 may include one or more display interfaces 238, which may interface with one or more display devices 240. Display devices 240 may be video display or integrated A/V devices. For example, display devices may display the video signal received by the computer system 200 together with presenting corresponding audio, e.g., through built-in speakers, or may display video alone, e.g., where corresponding audio is presented though a separate output device 246.

The computer system 200 may also include an input/output interface 242. The input/output interface 242 may be configured to interface the computer system 200 with one or more input devices 244 and/or output devices 246 for the transmission to and receipt from the respective input and output devices. The input/output interface 242 may include any suitable type of interface, and in some instances may include multiple types of interfaces, such as for interfacing with multiple types of input devices 244 and/or output devices 246. . Input devices 244 may include any suitable type of device for inputting data to a computer system 200, such as a keyboard, mouse, microphone, camera, touch screen, click wheel, scroll wheel, remote control, etc. Input devices 244 may be configured to receive input from a user of the computer system 200, such as the user 108, which may include an instruction to fast-forward or rewind A/V content, e.g., to navigate forward and backward through A/V content. Output devices may perform a wide variety of functions and may include status displays, audio systems (e.g. amplifiers and/or speakers), control interfaces associated with input devices, etc. Output devices 246 may include any suitable type of device for outputting data from a computer system 200, such as a speaker, remote control, headset, tactile feedback device, etc.

Methods for Network Control and Distribution of Bug Recovery Instructions

Figure 3:
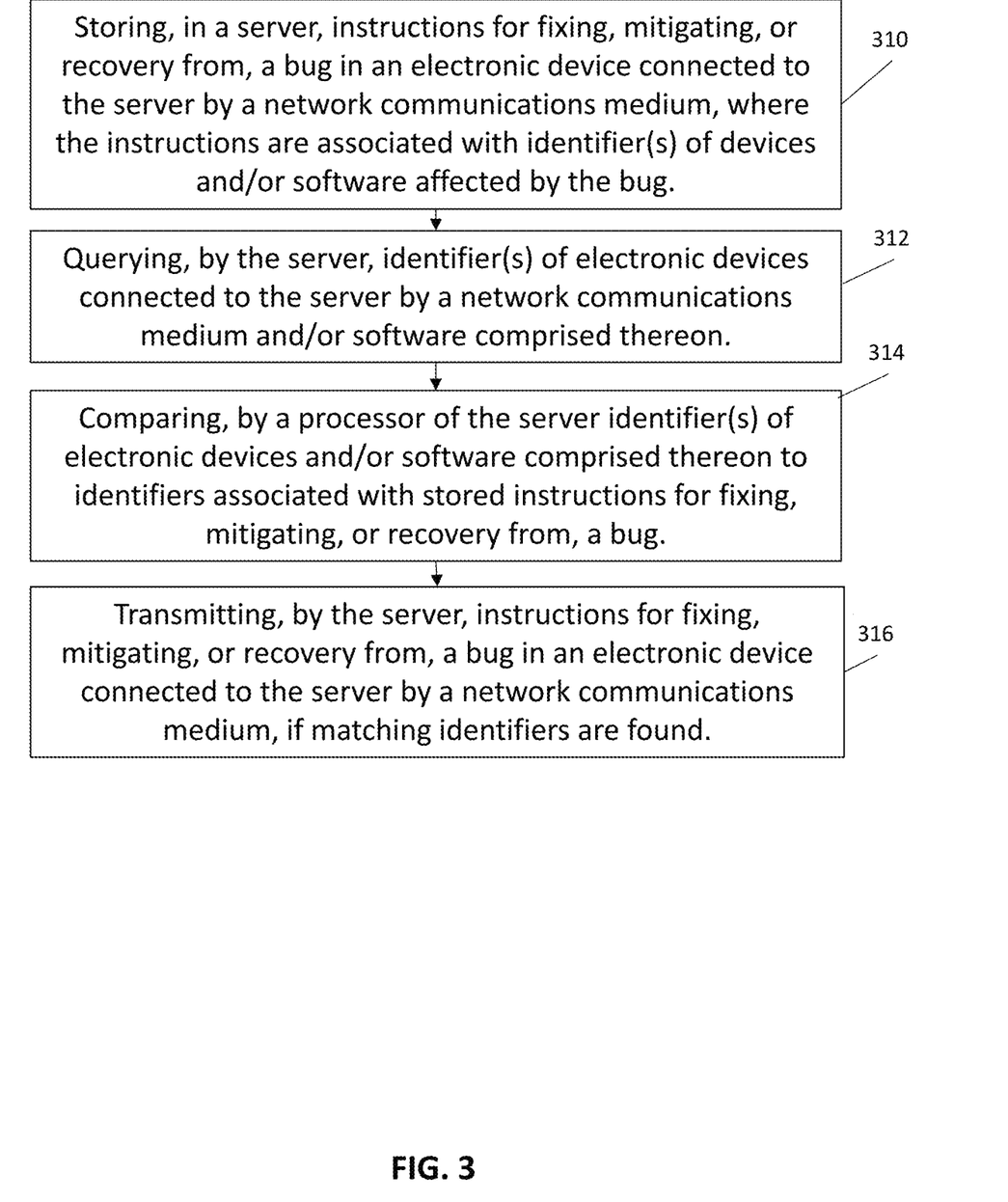
FIGS. 3-5 illustrate exemplary methods for controlling distribution of a bug fix over a network.

FIG. 3 is an illustration of a method for controlling distribution of bug recovery instructions over a network.

Instructions are stored 310 in a server for fixing, mitigating, or recovery from, a bug in an electronic device connected to the server by a network communications medium, where the instructions are associated with identifier(s) of devices and/or software affected by the bug. The instructions may be executable instructions for the electronic device to execute or may be instructions for a user to take specific actions. The instructions may be stored in the server in a suitable format, such as a database associating device model numbers or serial numbers, software names and version numbers, and/or firmware version numbers with each set of specific instructions.

The server may query 312 identifier(s) of electronic devices connected to the server by a network communications medium and/or software comprised thereon, for example electronic devices that are deployed on customer premises or owned by customers of a cable and/or internet service provider. Where the electronic device is a network device, e.g., a modem and/or router, the electronic device may also be queried for identifiers of devices attached thereto. Responses transmitted by the electronic devices can be compared 314 in the processor of the server to a listing of stored bug fix instructions, and the server can transmit 316 instructions to the affected electronic devices for execution by the electronic devices and/or to an electronic device of a user which can display or announce instructions to the user to take specific actions to mitigate or recover from a bug.

Figure 4:
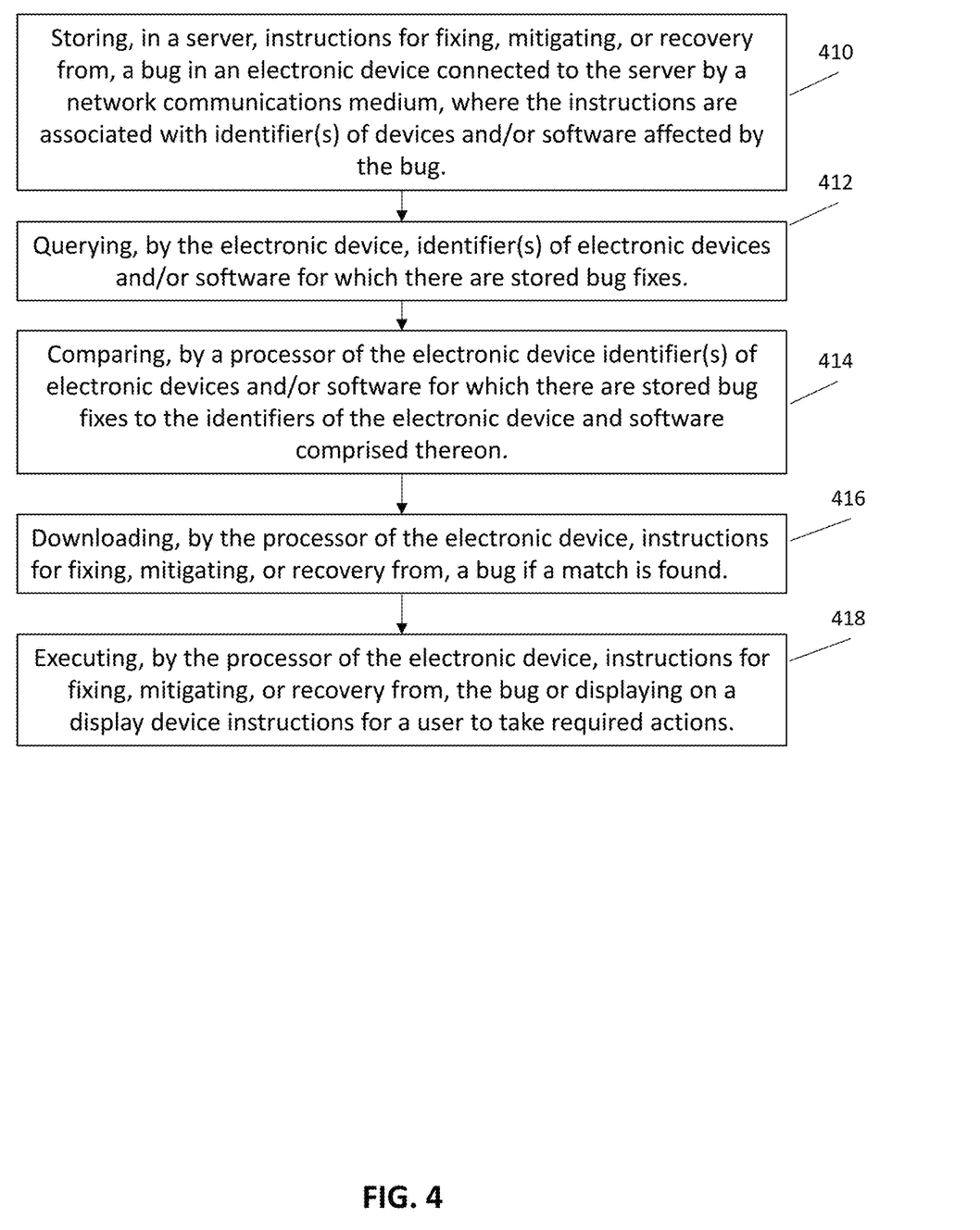

FIG. 4 is an illustration of another method for controlling distribution of bug recovery instructions over a network. As above, instructions are stored 410 in a server for fixing, mitigating, or recovery from, a bug in an electronic device connected to the server by a network communications medium, where the instructions are associated with identifier(s) of devices and/or software affected by the bug. Electronic devices can query 412 the server for a listing of identifier(s) of electronic devices and/or software for which there are stored bug fixes. The processor of an electronic device can compare 414 the listing of identifier(s) of electronic devices and/or software for which there are stored bug fixes to its own identifiers and identifiers of any software comprised in the electronic device. The processor of the electronic device can then download 416 instructions for fixing, mitigating, or recovery from, a bug if a match is found. The electronic device then executes 418 the instructions and/or can display or announce instructions to the user if any specific actions must be taken by the user to fix, mitigate, or recover from, a bug.

Figure 5:
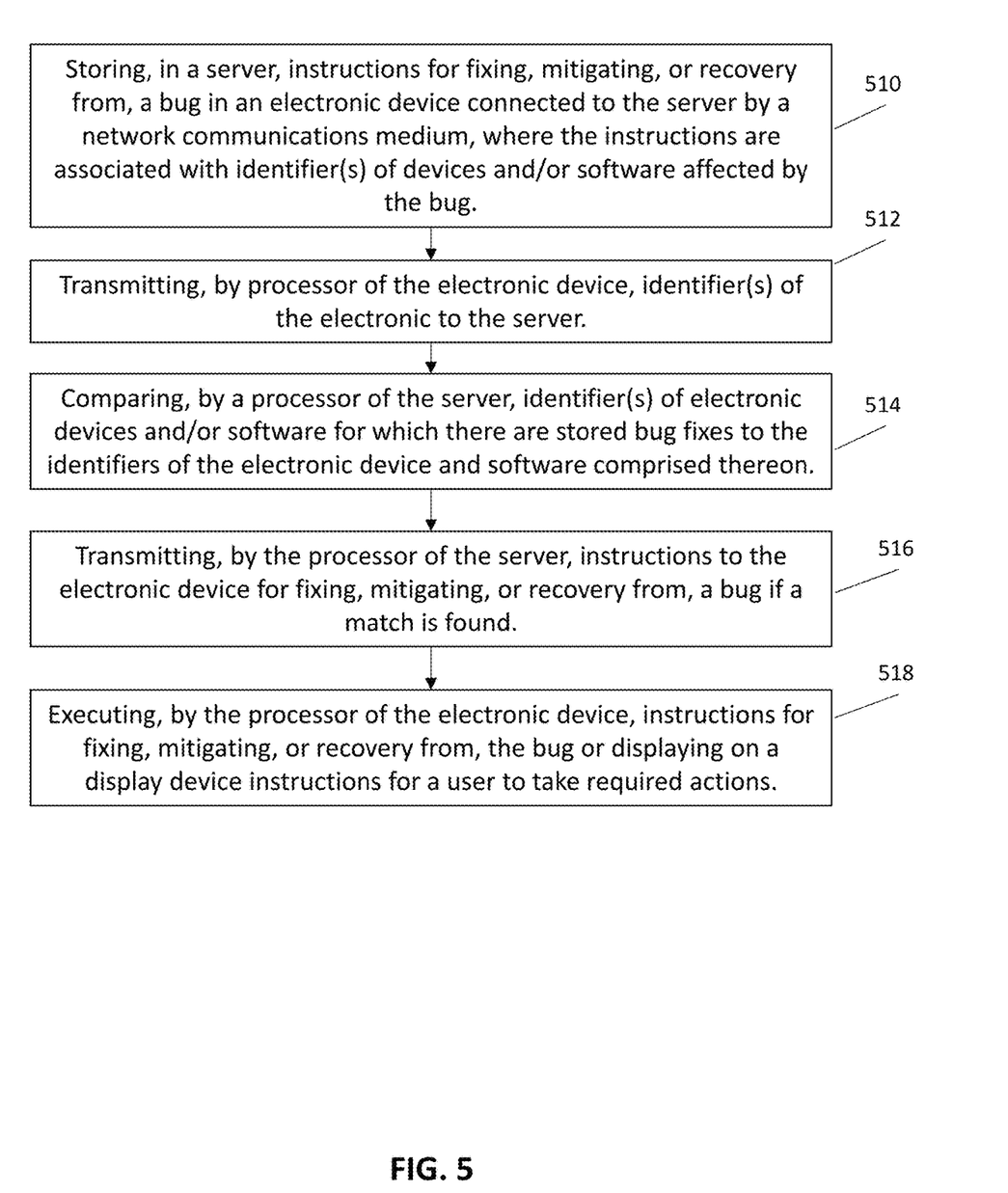

FIG. 5 is an illustration of another method for controlling distribution of bug recovery instructions over a network. As above, instructions are stored 510 in a server for fixing, mitigating, or recovery from, a bug in an electronic device connected to the server by a network communications medium, where the instructions are associated with identifier(s) of devices and/or software affected by the bug. Electronic devices can transmit 512 to the server a listing of identifier(s) of the electronic device and/or software comprised on the device. The processor of the server can compare 514 a listing of identifier(s) of electronic devices and/or software for which there are stored bug fixes to its the identifiers of the electronic device, its firmware, and/or identifiers of any software comprised in the electronic device. The processor of the server can then transmit 516 instructions for fixing, mitigating, or recovery from, a bug if a match is found. The electronic device then executes 518 the instructions and/or can display or announce instructions to the user if any specific actions must be taken by the user to fix, mitigate, or recover from, a bug.

EXAMPLES

Figure 6:
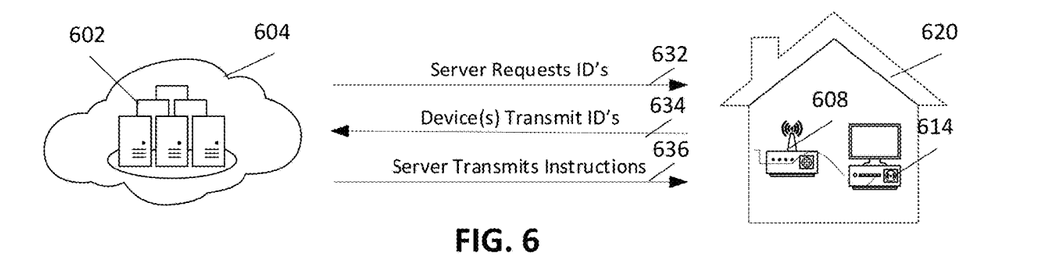
FIGS. 6-9 illustrate exemplary communications in a system for controlling distribution of a bug fix over a network.

As illustrated in FIG. 6, in one embodiment, communications flow may be directed from one or more servers 602, which may be physical servers or a virtual server, and may be comprised in a cloud service 604. A bug is discovered whereby a cache utilized by a third party application on a customer deployed device will occasionally become corrupted and prevent the operation of the service. Customer deployed devices may be, e.g., a set top box 614 or other streaming device connected to internet via DOCSIS modem 608 or similar devices within customer premises 620. Instructions are stored on a cloud server 602 that provide a rule for customer deployed device 614 to recognize when a cache file of the third party application corrupted has become corrupted and to delete the cache file.

In this example, the cloud server 602 queries 632 customer deployed device 614 requesting software ID's to determine if an affected version of the third party application is present on the device. In various embodiments, the query may request a response indicating whether a specific application having a specific version number(s) is installed, or may request an inventory of hardware and software/firmware ID(s). The query may be, as examples, in the form of a structured query to a database comprised in the memory of the customer deployed device or in the form of a script to be executed by a processor of the customer deployed device which will cause the processor to transmit an appropriate response. Customer deployed device 614 transmits 634 software ID(s) (e.g., a title and version number together with identifiers of any patch that may be currently applied) or another coded response that conveys essentially the same information about the specified application (e.g., an alphanumeric code designating the ID of the software, or a yes or no response to a specific query as to whether a specific application having a specific version number(s) is installed) or an inventory of installed software. If customer deployed device 614 has the affected software installed, then server 602 transmits 636 to the customer deployed device the instructions to fix or mitigate the bug to be executed by a processor of the customer deployed device (e.g., instructions that configure the processor of the customer deployed device to detect a corrupted cache file and delete the corrupted cache file).

Figure 7:
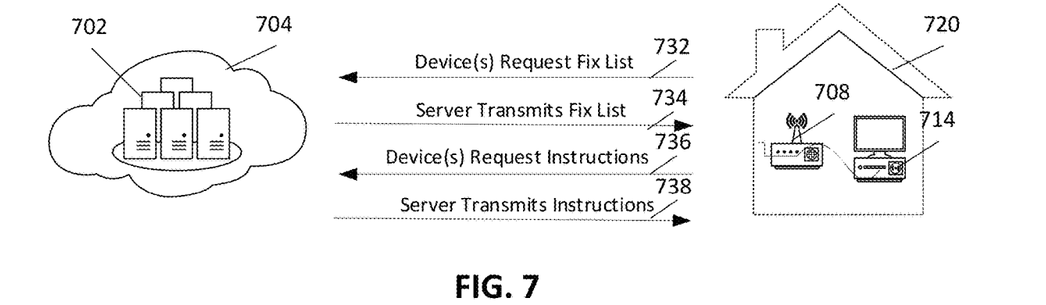

In other examples, a communication sequence may be initiated by a customer deployed device that is configured to request bug fix instructions, for example on a defined schedule or whenever one or more events occur (e.g., startup, restart, or detection of an error in operation). For example, with reference to FIG. 7, a bug is discovered whereby an optional service provided by firmware on a customer deployed device (e.g., a modem 708 or set top box 714 comprised within customer premises 720) can malfunction. The customer deployed device periodically queries 732 a server 702 which is comprised within a cloud service facility 704 to determine if any bug fix instructions have been stored on the cloud server for the firmware version of the customer deployed device. Cloud server 702 transmits 734 the requested listing. In one embodiment, the query may comprise a request for a listing of all bug fixes and/or firmware versions to which the bug fixes are applicable. The requested listing may be of all current bug fixes or only those that have been added to the server since the previous query. A processor of the customer deployed device 708 and/or 714 is configured to determine whether any listed bug fixes are applicable to the device. If so, the device requests 736 the applicable instructions. The cloud server transmits 738 the requested bug fix instructions to bypass or disable the affected service. If the bug fix instructions can be executed by the device without user intervention, then the instructions are executed by the device. If the bug fix instructions require user action, then bug fix instructions are displayed or announced by the electronic device, or another user electronic device.

Figure 8:
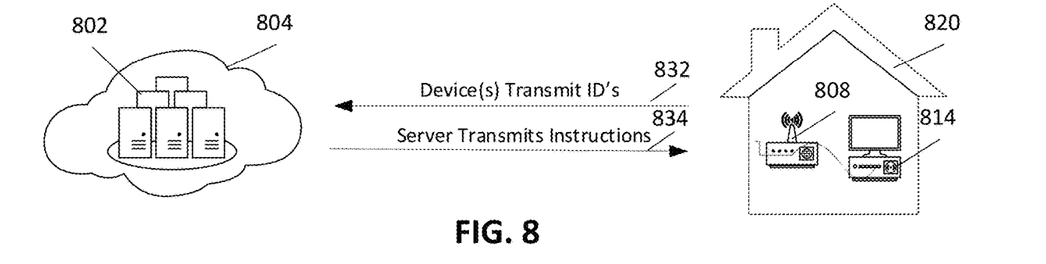

Of course, these examples, are not exhaustive. For example, in reference to FIG. 8 a customer deployed device 808 and/or 814 at a customer's home 820 may be configured to periodically (on a schedule and/or at startup) query 832 a server 802 comprised physically or virtually in a cloud facility 804 to determine whether any new bug fix instructions applicable to the device have been stored on the server. The query 832 may comprise transmission of one or more device ID(s) (e.g., model designation and/or serial numbers), firmware ID(s) (e.g, version numbers of the firmware, modules thereof, and/or currently applied patches) and/or a coded identifier of a deployment package, or similar identifying information, and/or software ID(s) of deployed or user installed applications. The server is configured to compare the ID(s) to a listing comprised in a database on the server and to determine whether any applicable instructions have been stored on the server. If so, the server transmits 834 the applicable instructions.

Figure 9:
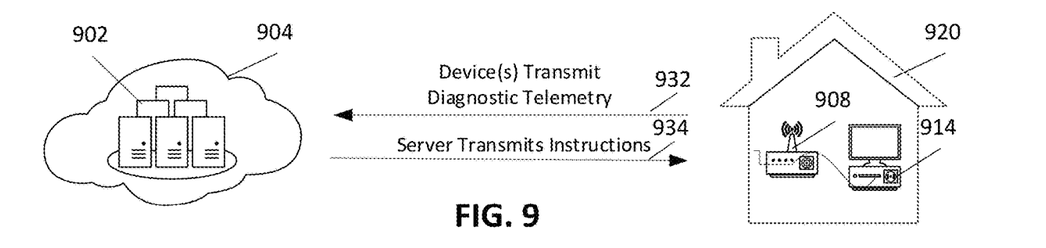

In another example, in reference, to FIG. 9, a customer deployed device such as a DOCSIS modem 808 and/or set top box 914 at a customer's home 920 may be configured to query 932 a server 902 comprised physically or virtually in a cloud facility 904 when an error or anomaly is detected during operation to determine whether any new bug fix instructions applicable to the device have been stored on the server. The query 932 may comprise transmission of diagnostic telemetry, (e.g., a code that identifies the error or anomaly) together with relevant device ID(s) (e.g, version numbers of the firmware, modules thereof, and/or currently applied patches) and/or a coded identifier of a deployment package, or similar identifying information, and/or software ID(s) of deployed or user installed applications. The server is configured to analyze or compare the telemetry to a listing of error conditions for which instructions have been stored in a database on the server and to determine whether any applicable instructions to fix or mitigate the error or anomaly have been stored on the server. If so, the server transmits 934 the applicable instructions to a customer device for execution or display or announcement as may be necessary to mitigate or fix the bug that caused the error.

It will be apparent to a person of ordinary skill in the art that aspects of the foregoing methods can be combined and exchanged. The systems and methods described herein can improve the operation of electronic devices in a network environment. For example, bug fixes can be more efficiently and uniformly distributed and users can be provided with instructions to mitigate the effects of bugs before a permanent upgrade is available to fix the bugs.

Thus in one example, a method for bug fix recovery in an electronic device connected to a network comprises:

storing, in memory of a server, a database comprising one or more bug fix entries, each bug fix entry comprising instructions for fixing, mitigating, or recovering from, an error or undesirable behavior of an electronic device, each entry associated with a device identifier and/or software identifier and/or firmware identifier;

querying, (a) by a processor of the server, a first electronic device connected to the server by a network communications medium for one or more identifiers of the electronic device and/or software and/or firmware stored on the electronic device and comparing, by the processor of the server, one or more identifiers received from the first electronic device to identifiers associated with stored bug fix entries, and/or (b) by a processor of a first electronic device in communication with the server by a network communications medium, the server for a listing of identifiers for which bug fix entries are stored on the server and comparing, by the processor of the electronic device, one or more identifiers received from the server to a device identifier and/or software identifier and/or firmware identifier of the electronic device, and/or (c) by a processor of a first electronic device in communication with the server by a network communications medium, the server for whether a bug fix entry is stored on the server for one or more device identifiers and/or software identifiers and/or firmware identifiers of the first electronic device; and, transmitting, by the processor of the server, to the processor of the first electronic device, instructions for fixing, mitigating, or recovering from, an error or undesirable behavior of the first electronic device or transmitting, by the processor of the server, to a second user electronic device instructions for fixing, mitigating, or recovering from, an error or undesirable behavior of the first electronic device.

The method may further comprise executing, by the processor of the electronic device instructions for fixing, mitigating, or recovering from, an error or undesirable behavior of the electronic device that have been received by the processor of the electronic device.

While the disclosure has been described in detail with reference to preferred embodiments thereof, it will be apparent to one skilled in the art that various changes can be made, and equivalents employed, without departing from the spirit and scope of the disclosure.

What is claimed is:

1. A method for bug fix recovery in an electronic device connected to a network, the method comprising:

storing, in memory of a server, a database comprising one or more bug fix entries, each bug fix entry comprising instructions for fixing, mitigating, or recovering from, an error or undesirable behavior of an electronic device, each entry associated with a device identifier and/or software identifier and/or firmware identifier;

performing at least one of:

(a) by a processor of the server, sending a query to a first electronic device communicatively connected to the server by a network communications medium, wherein the query is for one or more identifiers selected from the group consisting of identifiers of the electronic device and identifiers of software and/or firmware stored on the electronic device, and in response to receiving the one or more identifiers, comparing, by the processor of the server, one or more identifiers received from the first electronic device to one or more identifiers associated with stored bug fix entries,
- (b) by a processor of the first electronic device communicatively connected to the server by the network communications medium, sending a query to the server, wherein the query is for a listing of identifiers for which bug fix entries are stored on the server, and in response to receiving the listing of identifiers from the server, comparing, by the processor of the first electronic device, one or more identifiers in the listing to at least one of: a device identifier of the first electronic device, and a software identifier or firmware identifier of the electronic device, and sending, by the processor of the first electronic device to the server, a request for bug fix instructions if one or more identifiers in the listing match a device identifier of the first electronic device, and a software identifier or firmware identifier of the electronic device, and
- (c) by the processor of the first electronic device communicatively connected to the server by the network communications medium, sending a query to the server for whether a bug fix entry is stored on the server for one or more device identifiers and/or software identifiers and/or firmware identifiers of the first electronic device;

and performing at least one of:
  by the processor of the server, transmitting to the processor of the first electronic device, instructions for fixing, mitigating, or recovering from, an error or undesirable behavior of the first electronic device,
  and/or by the processor of the server, transmitting to a second electronic device instructions for fixing, mitigating, or recovering from, an error or undesirable behavior of the first electronic device.

2. The method of claim 1, wherein the method comprises performing, by the processor of the server, sending a query to a first electronic device communicatively connected to the server by a network communications medium, wherein the query is for one or more identifiers selected from the group consisting of identifiers of the electronic device and identifiers of software and/or firmware stored on the electronic device, and in response to receiving the one or more identifiers, comparing, by the processor of the server, one or more identifiers received from the first electronic device to identifiers associated with stored bug fix entries.

3. The method of claim 1, wherein the method comprises, by the processor of the first electronic device communicatively connected to the server by the network communications medium, sending a query to the server, wherein the query is for a listing of identifiers for which bug fix entries are stored on the server, and in response to receiving the listing of identifiers from the server, comparing, by the processor of the first electronic device, one or more identifiers in the listing to at least one of: a device identifier of the first electronic device, and a software identifier or firmware identifier of the electronic device, and sending, by the processor of the first electronic device to the server, a request for bug fix instructions if one or more identifiers in the listing match a device identifier of the first electronic device, and a software identifier or firmware identifier of the electronic device.

4. The method of claim 1, wherein the method comprises, by the processor of the first electronic device communicatively connected to the server by the network communications medium, sending a query to the server for whether a bug fix entry is stored on the server for one or more device identifiers and/or software identifiers and/or firmware identifiers of the first electronic device.

5. The method of claim 4, wherein the query comprises a listing of one or more device identifiers and/or software identifiers and/or firmware identifiers of the first electronic device.

6. The method of claim 5, wherein the query further comprises data communicating the state of the first electronic device at the time that an error or anomaly in operation was detected or a code identifying the nature of the error or anomaly.

7. The method of claim 1 further comprising executing, by the processor of the first electronic device instructions for fixing, mitigating, or recovering from, an error or undesirable behavior of the electronic device that have been received by the processor of the first electronic device.

8. The method of claim 1 further comprising displaying or announcing, by a display device connected to, or part of, the first or second electronic device, instructions for fixing, mitigating, or recovering from, an error or undesirable behavior of the first electronic device that have been received by the processor of the first or second electronic device.

9. The method of claim 1 further comprising displaying or announcing, by a display device connected to, or part of, the second electronic device, instructions for fixing, mitigating, or recovering from, an error or undesirable behavior of the first electronic device.

10. A system for bug fix recovery in an electronic device connected to a network, the system comprising:
  a server comprising a database comprising one or more bug fix entries, each bug fix entry comprising instructions for fixing, mitigating, or recovering from, an error or undesirable behavior of an electronic device, each entry associated with a device identifier and/or software identifier and/or firmware identifier; and, an electronic device in communication with the server by a network communications medium;
  wherein the server and the electronic device are configured to perform at least one of procedures (a)-(c):
   (a) by a processor of the server, sending a query to the electronic device, wherein the query is for one or more identifiers selected from the group consisting of identifiers of the electronic device and identifiers of software and/or firmware stored on the electronic device, and in response to receiving the one or more identifiers, comparing, by the processor of the server, one or more identifiers received from the electronic device to one or more identifiers associated with stored bug fix entries,
   (b) by a processor of the electronic device, sending a query to the server, wherein the query is for a listing of identifiers for which bug fix entries are stored on the server, and in response to receiving the listing of identifiers from the server, comparing, by the processor of the electronic device, one or more identifiers in the listing to at least one of: a device identifier of the electronic device, and a software identifier or firmware identifier of the electronic device, and sending, by the processor of the electronic device to the server, a request for bug fix instructions if one or more identifiers in the listing match a device identifier of the electronic device, and a software identifier or firmware identifier of the electronic device, and (c) by a processor of the electronic device, sending a query to the server for whether a bug fix entry is stored on the server for one or more device identifiers and/or software identifiers and/or firmware identifiers of the electronic device;

and, wherein the server is configured to transmit, by the processor of the server, to the processor of the electronic device, instructions for fixing, mitigating, or recovering from, an error or undesirable behavior of the electronic device.

11. The system of claim 10, wherein the server is configured to, by the processor of the server, send a query to the first electronic device, wherein the query is for one or more identifiers selected from the group consisting of identifiers of the electronic device and identifiers of software and/or firmware stored on the electronic device, and in response to receiving the one or more identifiers, compare, by the processor of the server, one or more identifiers received from the electronic device to one or more identifiers associated with stored bug fix entries.

12. The system of claim 10, wherein the electronic device is configured to, by the processor of the electronic device communicatively connected to the server by the network communications medium, send a query to the server, wherein the query is for a listing of identifiers for which bug fix entries are stored on the server, and in response to receiving the listing of identifiers from the server, compare, by the processor of the electronic device, one or more identifiers in the listing to at least one of: a device identifier of the electronic device, and a software identifier or firmware identifier of the electronic device, and send, by the processor of the first electronic device to the server, a request for bug fix instructions if one or more identifiers in the listing match a device identifier of the electronic device, and a software identifier or firmware identifier of the electronic device.

13. The system of claim 10, wherein the electronic device is configured to, by a processor of the electronic device, send a query to the server for whether a bug fix entry is stored on the server for one or more device identifiers and/or software identifiers and/or firmware identifiers of the electronic device.

14. The system of claim 10, wherein the electronic device is configured to execute, by the processor of the electronic device, instructions for fixing, mitigating, or recovering from, an error or undesirable behavior of the electronic device that have been received by the processor of the electronic device from the processor of the server.

15. The system of claim 10, wherein the electronic device is configured to display or announce, by a display device connected to, or part of, the electronic device, instructions for fixing, mitigating, or recovering from, an error or undesirable behavior of the electronic device that have been received by the processor of the electronic device.

16. The system of claim 10, further comprising a user display device configured to display or announce instructions for fixing, mitigating, or recovering from, an error or undesirable behavior of the electronic device.

17. A non-transitory computer readable medium having instructions operable to cause one or more processors to perform operations comprising:

storing in memory of a server a database comprising one or more bug fix entries, each bug fix entry comprising instructions for fixing, mitigating, or recovering from, an error or undesirable behavior of an electronic device, each entry associated with a device identifier and/or software identifier and/or firmware identifier;

sending, by a processor of the server, a query to an electronic device communicatively connected to the server by a network communications medium, wherein the query is for one or more identifiers selected from the group consisting of identifiers of the electronic device and identifiers of software and/or firmware stored on the electronic device, and in response to receiving the one or more identifiers, comparing, by the processor of the server, one or more identifiers received from the electronic device to one or more identifiers associated with stored bug fix entries; and to perform at least one of:

transmitting, by the processor of the server, to the processor of the electronic device, instructions for fixing, mitigating, or recovering from, an error or undesirable behavior of the electronic device or transmitting, by the processor of the server, to a second user electronic device instructions for fixing, mitigating, or recovering from, an error or undesirable behavior of the electronic device.

\* \* \* \* \*